United States Patent
Vogler

(10) Patent No.: US 6,175,176 B1
(45) Date of Patent: Jan. 16, 2001

(54) ELECTRIC MOTOR

(75) Inventor: Hans-Ulrich Vogler, Frankfurt am Main (DE)

(73) Assignee: Mannesmann VDO AG, Frankfurt (DE)

( * ) Notice: Under 35 U.S.C. 154(b), the term of this patent shall be extended for 0 days.

(21) Appl. No.: 09/319,896

(22) PCT Filed: Nov. 27, 1997

(86) PCT No.: PCT/EP97/06609

§ 371 Date: Aug. 19, 1999

§ 102(e) Date: Aug. 19, 1999

(87) PCT Pub. No.: WO98/27637

PCT Pub. Date: Jun. 25, 1998

(30) Foreign Application Priority Data

Dec. 14, 1996 (DE) .............................................. 196 52 085

(51) Int. Cl.$^7$ .................................................... H02K 21/26
(52) U.S. Cl. ..................... 310/154; 310/156; 310/152; 310/218; 310/246; 310/247; 310/259
(58) Field of Search ................................... 310/154, 152, 310/218, 246, 247, 156, 259

(56) References Cited

U.S. PATENT DOCUMENTS

| | | | |
|---|---|---|---|
| 5,015,896 | * 5/1991 | Wong | 310/71 |
| 5,473,210 | * 12/1995 | Someya et al. | 310/154 |
| 5,497,039 | * 3/1996 | Blaettner et al. | 310/154 |
| 5,619,084 | * 4/1997 | Lau | 310/154 |
| 5,874,794 | * 2/1999 | Trammell et al. | 310/154 |
| 5,959,386 | * 9/1999 | Knight | 310/154 |

FOREIGN PATENT DOCUMENTS

| | | |
|---|---|---|
| 0334662 | 9/1989 | (EP) . |
| 2700077 | 7/1994 | (FR) . |
| 2209880 | 5/1989 | (GB) . |

* cited by examiner

Primary Examiner—Nestor Ramirez
Assistant Examiner—Thanh Lam
(74) Attorney, Agent, or Firm—Martin A. Farber

(57) ABSTRACT

An electric motor with a stator having two magnetic shells (2, 3) has a spring element (6) which prestresses the magnetic shells (2, 3) against a stop fixed to the housing. The spring element (6) bears on both magnetic shells (2, 3) with in each case two bearing points. The spring element (6) has a particularly low spring stiffness as a result of this.

6 Claims, 1 Drawing Sheet

ELECTRIC MOTOR

FIELD AND BACKGROUND OF THE INVENTION

The invention relates to an electric motor with a stator having two magnetic shells and with a spring element which is designed to prestress the magnetic shells of the stator against a fixed stop.

Such electric motors are frequently used, particularly in motor vehicles, and are thus known. As a rule, the electric motor has, as stator, two half shell-shaped magnetic shells which bear on an outer wall of the housing of the electric motor and whose edges each bear on stops. The spring element is arranged between the magnetic shells and prestresses the magnetic shells simultaneously against their stops. The spring element of an electric motor disclosed in the art is designed as strip steel bent in the shape of a V.

The known electric motor has the disadvantage that the spring element is supported on two mutually opposite bearing points and can therefore tilt. In the worst-case scenario, the tilting of the spring element leads to blocking of a rotor rotating between the magnetic shells. In order to avoid tilting, it is necessary, therefore, for the spring element to be supported in a complicated manner. Furthermore, for example in the case of low-power motors of actuators of a motor vehicle, the magnetic shells have tolerances which lead to a change in the clamping region of the spring of more than 3 mm. The spring element must reliably support a basic force with an extremely large gap tolerance margin. The large gap tolerance margin then means, however, that in the event of an extremely small tolerance margin occurring, in conjunction with the stiffness of the spring element, the holding force of the latter is very high. The softer the spring can be, however, the more favorable the situation is.

SUMMARY OF THE INVENTION

The invention is based on the object of configuring an electric motor of the type mentioned in the introduction in such a way that the spring element is prevented from tilting without complicated supporting means, and that the electric motor can be assembled in a particularly simple manner.

This object is solved according to the invention by the spring element having two bearing points on one of the magnetic shells and at least one bearing point on the other magnetic shell.

As a result of this, the spring element bears reliably on the two magnetic shells with at least three bearing points. Tilting of the spring element is therefore precluded without additional supporting means.

By virtue of the configuration according to the invention, the spring element can have a lower spring stiffness than the V-shaped spring element of the known electric motor. The electric motor can be assembled in a particularly simple manner as a result of this.

The security against tilting of the spring element is particularly high, in accordance with an advantageous development of the invention, if said spring element has in each case two bearing points on both sides. Moreover, this configuration makes it possible to use a spring element having a particularly low stiffness, since more resilient length is fixed in the constructional space.

In accordance with another advantageous development of the invention, the spring element can be manufactured particularly cost-effectively if it is produced from a spring material in the form of a wire.

In accordance with another advantageous development of the invention, the spring element does not require any anti-rotation means on the magnetic shells if it is produced from a spring material in the form of a strip.

It would be possible for one end region of the spring element to bear on one magnetic shell and the other end region of said spring element to bear on the other magnetic shell. However, the spring element has a large tensioning region and can be designed with small spring stiffness if, in accordance with another advantageous development of the invention, the end regions of said spring element in each case bear on one of the magnetic shells. The assembly of the electric motor according to the invention is further simplified as a result of this.

BRIEF DESCRIPTION OF THE DRAWINGS

The invention permits numerous embodiments. In order further to elucidate its basic principle, two of these embodiments are illustrated in the drawing and are described below. In the drawing.

DETAILED DESCRIPTION OF THE PREFERRED EMBODIMENTS

Figure 1:
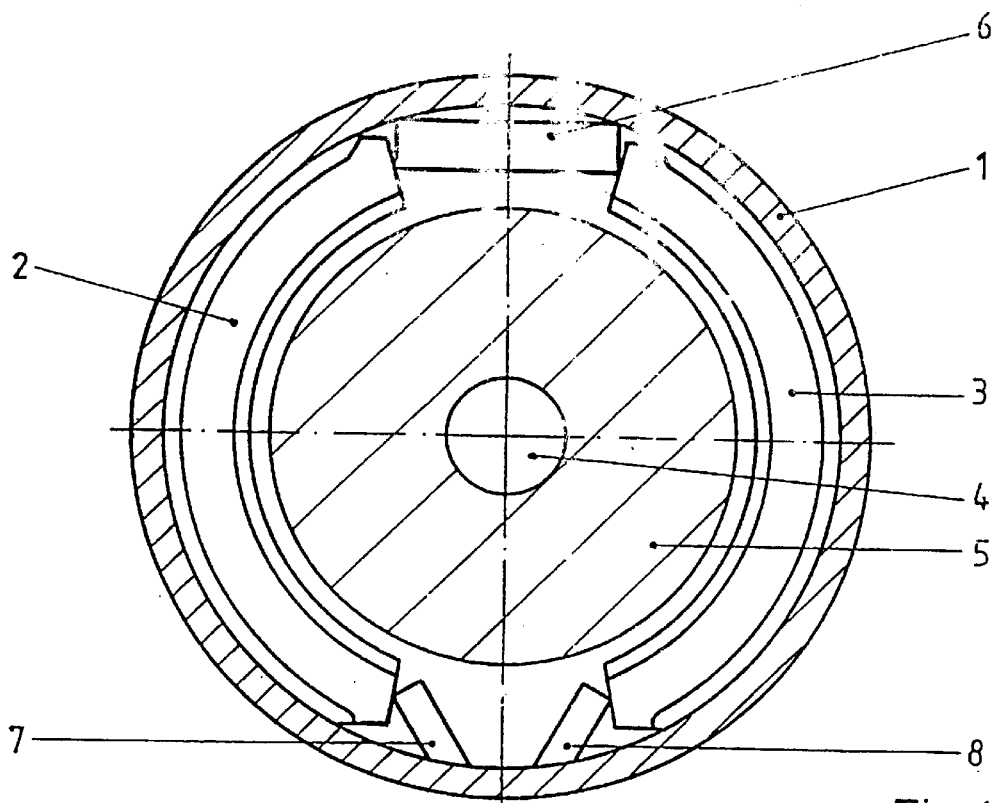
FIG. 1 shows a sectional view of an electric motor according to the invention.
Figure 2:
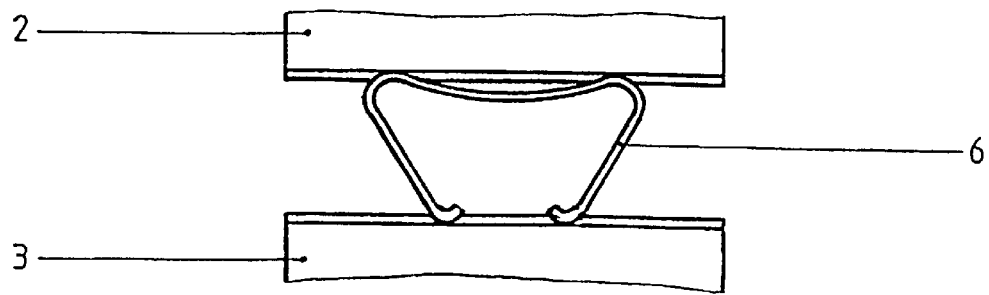
FIG. 2 shows a plan view of a spring element of the electric motor from FIG. 1.

FIG. 1 shows a cross section through an electric motor having two magnetic shells 2, 3 fixed in a housing 1. A rotor 5 fixed on a motor shaft 4 is arranged between the magnetic shells 2, 3. The magnetic shells 2, 3 are prestressed by a spring element 6, which is produced from a material in the form of a strip, against stops 7, 8 of the housing 1. FIG. 2 shows the spring element 6 in a view from above with adjoining regions of the magnetic shells 2, 3. The spring element 6 bears on both magnetic shells 2, 3 with in each case two bearing points. The end regions of the spring element 6 bear on one of the magnetic shells 3.

Figure 3:
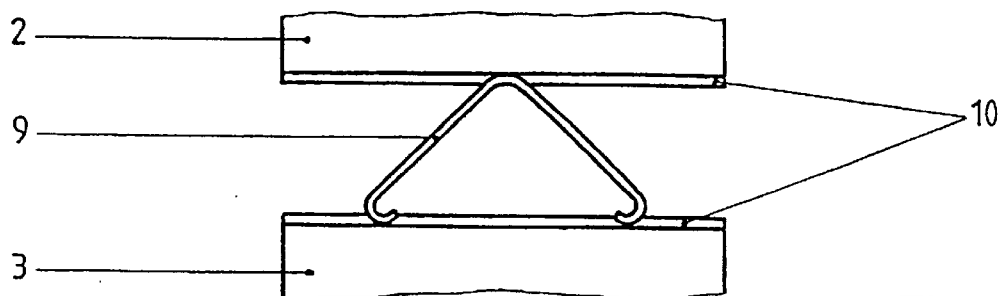
FIG. 3 shows a further embodiment of the spring element.

FIG. 3 shows a spring element 9, which bears on one of the magnetic shells 2 with one bearing point and on the other magnetic shell 3 with two bearing points. The spring element 9 is produced from a spring material in the form of a wire and is secured against rotation by means of shoulders 10 worked into the magnetic shells 2, 3.

I claim:

1. An electric motor with a stator having two magnetic shells and with a spring element which prestresses the magnetic shells of the stator against a fixed stop (7, 8), wherein the spring element (6, 9) has two bearing points on one of the magnetic shells (3) and at least one bearing point on the other magnetic shell (2), the at least three bearing points serving to introduce a spring force of the spring element in circumferential direction urges the two magnetic shells against the fixed stop.

2. The electric motor as claimed in claim 1, wherein the spring element (6) has in each case two bearing points on both sides.

3. The electric motor as claimed in claim 1, wherein the spring element (6, 9) is produced from a spring material in the form of a wire.

4. The electric motor as claimed in claim 1, wherein the spring element (6, 9) is produced from a spring material in the form of a strip.

5. The electric motor as claimed in claim 1, wherein the end regions of the spring element (6, 9) in each case bear on one of the magnetic shells (3).

6. An electric motor with a stator having two stops and two magnetic shells arranged serially along a circumference of the stator between the two stops, the motor further comprising a spring element located between the two magnetic shells for prestressing the magnetic shells against respective ones of the stops, wherein the spring element having a circumferential direction force contacts one of the magnetic shells via two bearing points and contacts the other magnetic shell via at least one bearing point to stabilize orientation of the spring element.

* * * * *